US006717150B2

(12) United States Patent
Hoffman

(10) Patent No.: US 6,717,150 B2
(45) Date of Patent: Apr. 6, 2004

(54) SOLID-STATE CT DETECTOR MODULES WITH IMPROVED SCINTILLATOR/DIODE COUPLING

(75) Inventor: David M. Hoffman, New Berlin, WI (US)

(73) Assignee: GE Medical Systems Global Technology Company, LLC, Waukesha, WI (US)

( * ) Notice: Subject to any disclaimer, the term of this patent is extended or adjusted under 35 U.S.C. 154(b) by 0 days.

(21) Appl. No.: 09/735,131

(22) Filed: Dec. 12, 2000

(65) Prior Publication Data

US 2002/0070343 A1 Jun. 13, 2002

(51) Int. Cl.[7] .................................................. G01T 1/20
(52) U.S. Cl. .................. 250/370.11; 250/367
(58) Field of Search ...................... 250/370.11, 363.02, 250/367, 370.09

(56) References Cited

U.S. PATENT DOCUMENTS

| 4,464,776 | A | | 8/1984 | Erker | |
|---|---|---|---|---|---|
| 4,823,016 | A | * | 4/1989 | Yamashita et al. | 250/367 |
| 4,965,726 | A | | 10/1990 | Heuscher et al. | |
| 5,499,281 | A | | 3/1996 | Weedon et al. | |
| 5,506,408 | A | * | 4/1996 | Vickers et al. | 250/367 |
| 5,592,523 | A | | 1/1997 | Tuy et al. | |
| 5,773,829 | A | * | 6/1998 | Iwanczyk et al. | 250/370.11 |
| 6,091,795 | A | * | 7/2000 | Schafer et al. | 250/370.11 |
| 6,144,718 | A | | 11/2000 | Hoffman et al. | |
| 6,252,927 | B1 | * | 6/2001 | Wieczorek et al. | 250/367 |
| 6,362,480 | B1 | * | 3/2002 | Peter et al. | 250/366 |

* cited by examiner

*Primary Examiner*—Constantine Hannaher
(74) *Attorney, Agent, or Firm*—Carl B. Horton, Esq.; Armstrong Teasdale LLP

(57) ABSTRACT

A finished detector module suitable for use in a computed tomography (CT) imaging system is provided. The finished detector module includes a substrate; a photosensor array mounted on the substrate; an array of scintillators optically coupled to the photosensor array and separated therefrom by a gap filled with either air or a compliant clear film, and a flexible electrical cable electrically coupled to the photosensor array.

14 Claims, 6 Drawing Sheets

SOLID-STATE CT DETECTOR MODULES WITH IMPROVED SCINTILLATOR/DIODE COUPLING

BACKGROUND OF THE INVENTION

This invention relates generally to radiation detectors of the scintillating type, and more particularly to methods and apparatus for coupling a scintillator to a photo sensor.

In at least one known computed tomography (CT) imaging system configuration, an x-ray source projects a fan-shaped beam which is collimated to lie within an X-Y plane of a Cartesian coordinate system and generally referred to as the "imaging plane". The x-ray beam passes through the object being imaged, such as a patient. The beam, after being attenuated by the object, impinges upon an array of radiation detectors. The intensity of the attenuated beam radiation received at the detector array is dependent upon the attenuation of the x-ray beam by the object. Each detector element of the array produces a separate electrical signal that is a measurement of the beam attenuation at the detector location. The attenuation measurements from all the detectors are acquired separately to produce a transmission profile.

In known third generation CT systems, the x-ray source and the detector array are rotated with a gantry within the imaging plane and around the object to be imaged so that the angle at which the x-ray beam intersects the object constantly changes. A group of x-ray attenuation measurements, i.e., projection data, from the detector array at one gantry angle is referred to as a "view". A "scan" of the object comprises a set of views made at different gantry angles, or view angles, during one revolution of the x-ray source and detector. In an axial scan, the projection data is processed to construct an image that corresponds to a two dimensional slice taken through the object. One method for reconstructing an image from a set of projection data is referred to in the art as the filtered back projection technique. This process converts the attenuation measurements from a scan into integers called "CT numbers" or "Hounsfield units", which are used to control the brightness of a corresponding pixel on a cathode ray tube display.

At least one known detector in CT imaging systems comprises a plurality of detector modules, each having a scintillator array optically coupled to a semiconductor photodiode array that detects light output by the scintillator array. These known detector module assemblies require an adhesive bonding operation to assemble. The photodiode array and scintillator must be accurately aligned with an alignment system, using a plastic shim to set a gap between the photodiode and scintillator arrays. After alignment, the four corners of the assembly are "tacked" together with an adhesive to hold the alignment. The tack is cured, and the thin gap between the photodiode and scintillator arrays is filled by dipping the assembly into an optical epoxy adhesive, which wicks into the entire gap. The epoxy is cured, and the scintillator is thus "epoxied" to the diode array. Thus, in a "finished" detector module the photodiode array and the scintillator array are separated by a solid, inflexible, non-compliant material. (A detector module having epoxy that is still undergoing curing is not considered a "finished" detector module.)

This standard scintillator assembly and assembly process suffers from a number of disadvantages. First, the thermal coefficient of expansions of the semiconductor photodiode array and the scintillator array are somewhat different. As the ambient temperature changes during operation of an imaging system, thermal and dimensional stress occurs. Other factors that can result in thermal and dimensional stress are temperature changes during shipping and/or storing, slight air conditioning and humidity changes, and changes in operating conditions. As a result of these stresses, breakage can occur at the interface between the diode and the epoxy, within the epoxy itself, or between the epoxy and the scintillator. Breakage can also occur within the scintillator array or semiconductor diode array itself. Such breakage can be microscopic, in which case, light transmission efficiency is affected, or catastrophic, resulting in destruction of the detector module. It would be desirable to reduce the frequency of breakage, whether microscopic or catastrophic, to increase the reliability of the scintillator assembly and of instruments using scintillator assemblies. In addition, the photosensor array and scintillator array cannot readily be separated. Thus, parts of the detector module cannot be recovered from scrap assemblies. It would therefore be desirable to provide a detector module that is more amenable to scrap recovery procedures.

BRIEF SUMMARY OF THE INVENTION

There is therefore provided, in one embodiment of the present invention, a finished detector module assembly suitable for use in a computed tomography (CT) imaging system. The detector module assembly includes a substrate; a photosensor array mounted on the substrate; an array of scintillators optically coupled to the photosensor array and separated therefrom by a gap filled with either air or a compliant clear film; and a flexible electrical cable electrically coupled to the photosensor array.

Among other advantages, the scintillator array and the photosensor array of the above-described detector module embodiment can be readily separated, thus allowing recovery of parts in scrap assemblies.

In addition, this and other embodiments of the invention provide various combinations of additional advantages, including an improved coupling process, low cost due to a simpler manufacturing process with fewer steps, high light output, lower cross talk, improved gain uniformity, and reliability and lifetime.

DETAILED DESCRIPTION OF THE INVENTION

Figure 1:
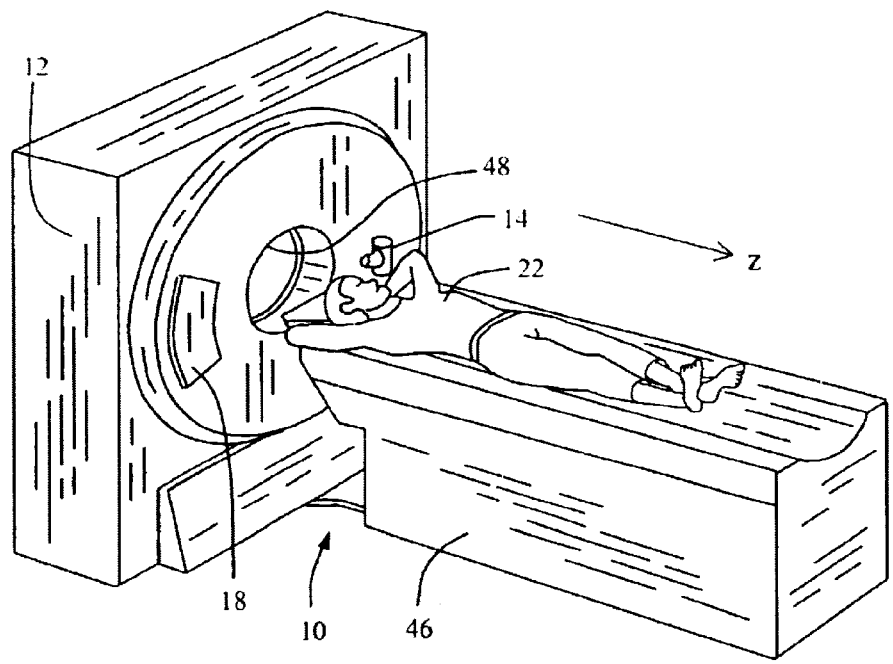
FIG. 1 is a pictorial view of a CT imaging system.
Figure 2:
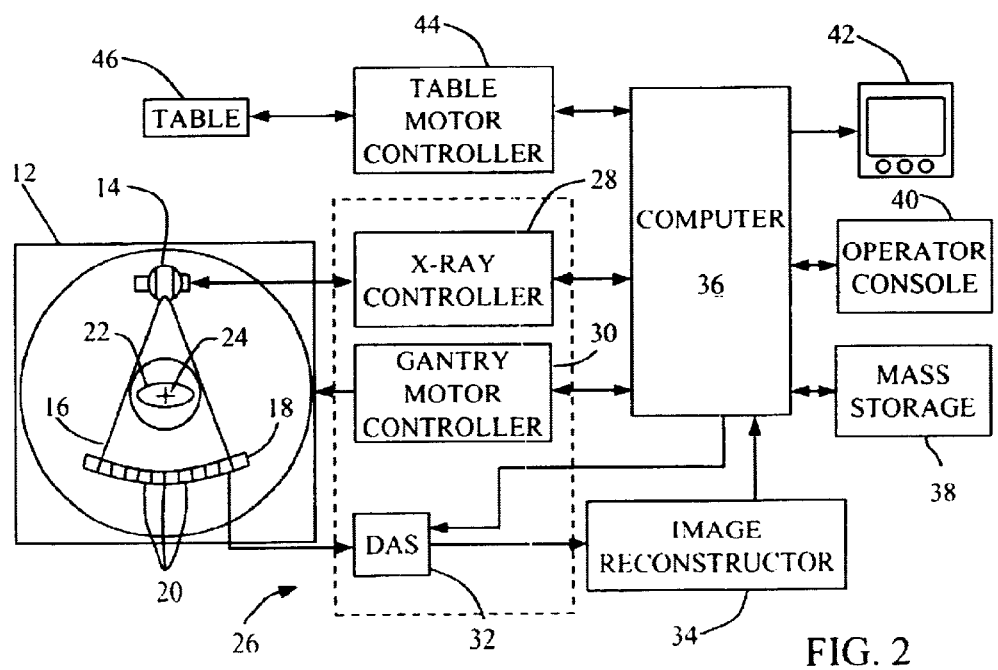
FIG. 2 is a block schematic diagram of the system illustrated in FIG. 1.

Referring to FIGS. 1 and 2, a computed tomography (CT) imaging system 10 is shown as including a gantry 12 representative of a "third generation" CT scanner. Gantry 12 has an x-ray source 14 that projects a beam of x-rays 16 toward a detector array 18 on the opposite side of gantry 12. Detector array 18 is formed by detector elements 20 which together sense the projected x-rays that pass through an object 22, for example a medical patient. Each detector element 20 produces an electrical signal that represents the intensity of an impinging x-ray beam and hence the attenuation of the beam as it passes through patient 22. During a scan to acquire x-ray projection data, gantry 12 and the components mounted thereon rotate about a center of rotation 24. Detector array 18 may be fabricated in a single slice or multi-slice configuration. In a multi-slice configuration, detector array 18 has a plurality of rows of detector elements 20, only one of which is shown in FIG. 2.

Rotation of gantry 12 and the operation of x-ray source 14 are governed by a control mechanism 26 of CT system 10. Control mechanism 26 includes an x-ray controller 28 that provides power and timing signals to x-ray source 14 and a gantry motor controller 30 that controls the rotational speed and position of gantry 12. A data acquisition system (DAS) 32 in control mechanism 26 samples analog data from detector elements 20 and converts the data to digital signals for subsequent processing. An image reconstructor 34 receives sampled and digitized x-ray data from DAS 32 and performs high speed image reconstruction. The reconstructed image is applied as an input to a computer 36 which stores the image in a mass storage device 38.

Computer 36 also receives commands and scanning parameters from an operator via console 40 that has a keyboard. An associated cathode ray tube display 42 allows the operator to observe the reconstructed image and other data from computer 36. The operator supplied commands and parameters are used by computer 36 to provide control signals and information to DAS 32, x-ray controller 28 and gantry motor controller 30. In addition, computer 36 operates a table motor controller 44 which controls a motorized table 46 to position patient 22 in gantry 12. Particularly, table 46 moves portions of patient 22 through gantry opening 48.

Figures 3, 4:
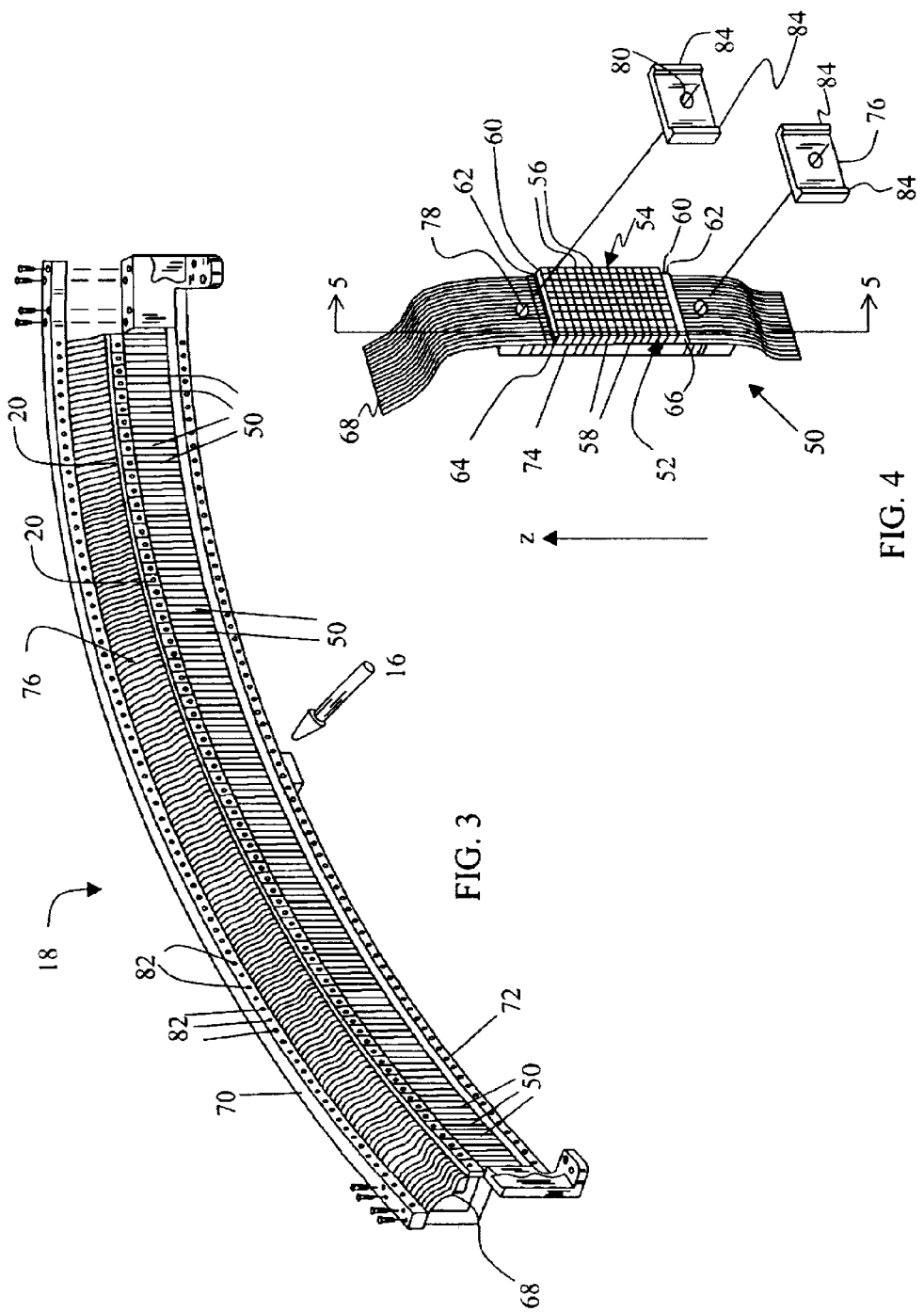
FIG. 3 is a perspective view of one embodiment of a CT system detector array of the present invention.
FIG. 4 is a perspective view of one of the detector module assemblies of the detector array shown in FIG. 3.

As shown in FIGS. 3 and 4, detector array 18 includes a plurality of detector module assemblies 50 (also referred to as detector modules), each module comprising an array of detector elements 20. Each detector module 50 includes a high-density photosensor array 52 and a multidimensional scintillator array 54 positioned above and adjacent to photosensor array 52. Particularly, scintillator array 54 includes a plurality of scintillators 56, while photosensor array 52 includes photodiodes 58, a switch apparatus 60, and a decoder 62. A material such as a titanium dioxide-filled epoxy fills the small spaces between scintillator elements. Photodiodes 58 are individual photodiodes. In another embodiment, photodiodes 58 are a multidimensional diode array. In either embodiment, photodiodes 58 are deposited or formed on a substrate. Scintillator array 54, as known in the art, is positioned over or adjacent photodiodes 58. Photodiodes 58 are optically coupled to scintillator array 54 and have electrical output lines for transmitting signals representative of the light output by scintillator array 54. Each photodiode 58 produces a separate low level analog output signal that is a measurement of beam attenuation for a specific scintillator of scintillator array 54. Photodiode output lines (not shown in FIGS. 3 or 4) may, for example, be physically located on one side of module 20 or on a plurality of sides of module 20. In the embodiment illustrated in FIG. 4, photodiode outputs are located at opposing sides of the photodiode array.

In one embodiment, as shown in FIG. 3, detector array 18 includes fifty-seven detector modules 50. Each detector module 50 includes a photosensor array 52 and scintillator array 54, each having a detector element 20 array size of 16×16. As a result, array 18 is segmented into 16 rows and 912 columns (16×57 modules) allowing up to N=16 simultaneous slices of data to be collected along a z-axis with each rotation of gantry 12, where the z-axis is an axis of rotation of the gantry.

Switch apparatus 60 is a multidimensional semiconductor switch array. Switch apparatus 60 is coupled between photosensor array 52 and DAS 32. Switch apparatus 60, in one embodiment, includes two semiconductor switch arrays 64 and 66. Switch arrays 64 and 66 each include a plurality of field effect transistors (FETs) (not shown) arranged as a multidimensional array. Each FET includes an input electrically connected to one of the respective photodiode output lines, an output, and a control (not shown). FET outputs and controls are connected to lines that are electrically connected to DAS 32 via a flexible electrical cable 68. Particularly, about one-half of the photodiode output lines are electrically connected to each FET input line of switch 64 with the other one-half of photodiode output lines electrically connected to FET input lines of switch 66. Flexible electrical cable 68 is thus electrically coupled to photosensor array 52, and is attached, for example, by wire bonding.

Decoder 62 controls the operation of switch apparatus 60 to enable, disable, or combine photodiode 58 outputs depending upon a desired number of slices and slice resolutions for each slice. Decoder 62, in one embodiment, is an FET controller as known in the art. Decoder 62 includes a plurality of output and control lines coupled to switch apparatus 60 and DAS 32. Particularly, the decoder outputs are electrically coupled to the switch apparatus control lines to enable switch apparatus 60 to transmit the proper data from the switch apparatus inputs to the switch apparatus outputs. Utilizing decoder 62, specific FETs within switch apparatus 60 are selectively enabled, disabled, or combined so that specific photodiode 58 outputs are electrically connected to CT system DAS 32. Decoder 62 enables switch apparatus 60 so that a selected number of rows of photosensor array 52 are connected to DAS 32, resulting in a selected number of slices of data being electrically connected to DAS 32 for processing.

As shown in FIGS. 3 and 4, detector modules 50 are fitted into detector array 18 and secured in place by rails 70 and 72. FIG. 3 shows rail 72 already secured in place, while rail 70 is about to be secured over electrical cable 68, over module 50 substrate 74, flexible cable 68, and mounting bracket 76. Screws (not shown in FIGS. 3 or 4) are then threaded through holes 78 and 80 and into threaded holes 82 of rail 70 to secure modules 50 in place. Flanges 84 of mounting brackets 76 are held in place by compression against rails 70 and 72 (or by bonding, in one embodiment) and prevent detector modules 50 from "rocking." Mounting brackets 76 also clamp flexible cable 68 against substrate 74, or, in one embodiment, flexible cable 68 is also adhesively bonded to substrate 74.

Figure 5:
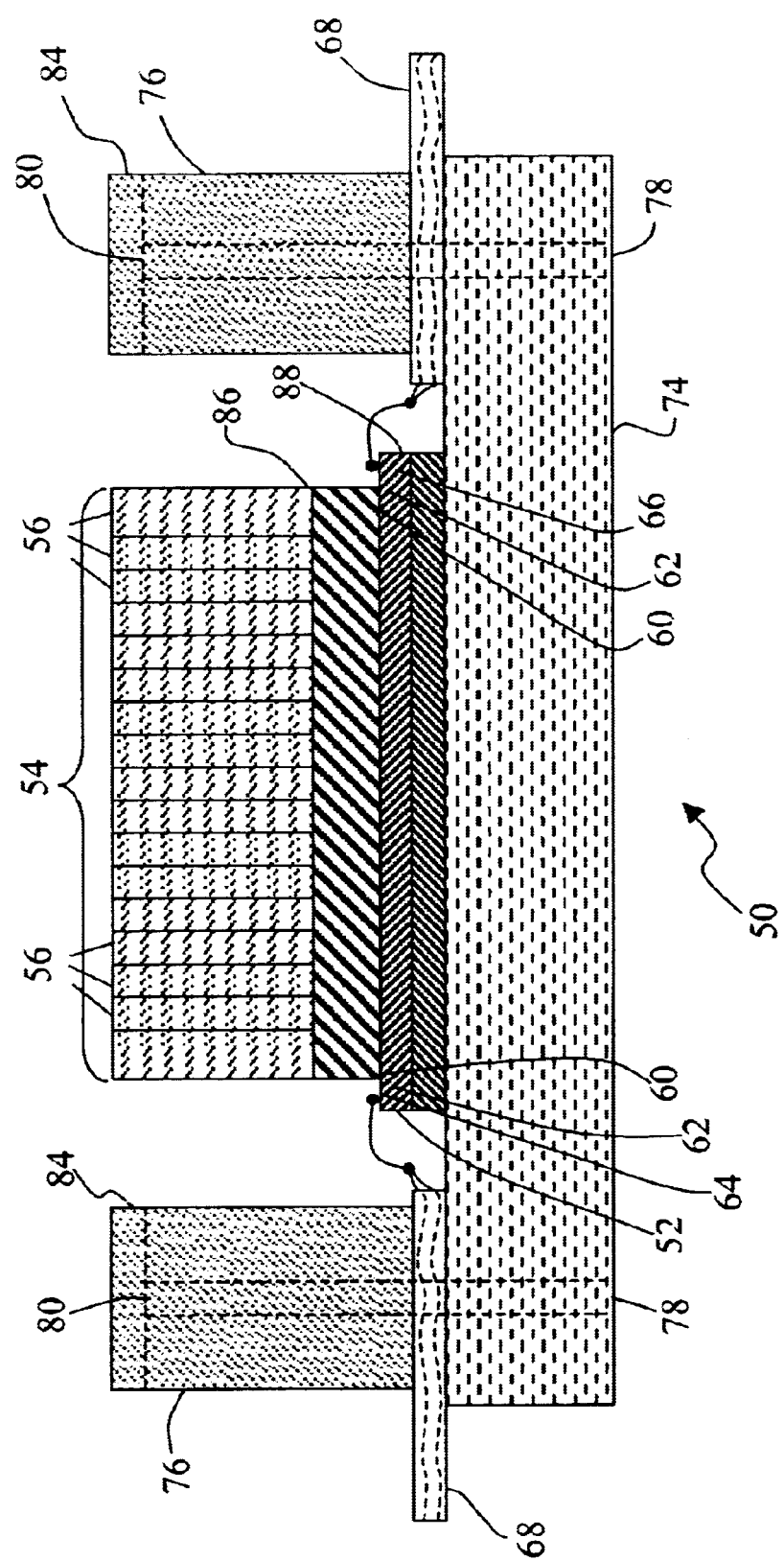
FIG. 5 is a schematic cut-away view of the detector module assembly embodiment of FIG. 4 along a section labeled 5—5.

In one embodiment and as shown in FIG. 5, detector modules 50 include a compliant, clear (i.e., transparent) film 86 between photosensor array 52 and scintillator array 54.

Suitable materials for a compliant film include, but are not limited to, elastomeric materials such as silicone, polyester, and acrylic materials. Soft, compliant gels are also suitable, such as silicate and organic gels. In the embodiment represented in FIG. 5, compliant, clear film 86 is adhesive, although in other embodiments, film 86 is not adhesive and a clamping arrangement is used to hold scintillator array 54 in place. Compliant, clear film 86 advantageously fills gaps and voids on the surfaces of photosensor array 52 and scintillator array 54. An adhesive layer 88 holds semiconductor layer 52 in place on ceramic substrate 74. In this embodiment, mounting brackets 76 do not contact scintillator array 54 and may be made of metal or another suitable material. This embodiment is relatively inexpensive to produce, and allows scintillator array 54 to be easily separated from photosensor array 52 for servicing or salvaging. In addition, compliant clear film 86 provides relatively efficient optical coupling between scintillators 56 and their respective diodes in photosensor array 52.

This embodiment can be made by a method including a step of adhesively bonding photosensor array 52 to substrate 74. Flexible cable 68 is also electrically and mechanically bonded to photosensor array 52, for example, by wire bonding. Rectangles of film 86 are preformed by a stamping operation, the rectangles having a size and a shape configured for placement between and optical coupling of photosensor array 52 and scintillator array 54. In one embodiment, film 86 is an epoxy-based adhesive film and is large enough to optically couple all elements of scintillator array 54 to photosensor array 52. Preformed film rectangle 86 is placed on top of photosensor array 52 and scintillator array 54 is laid in place on top of film rectangle 86.

Figures 6, 7:
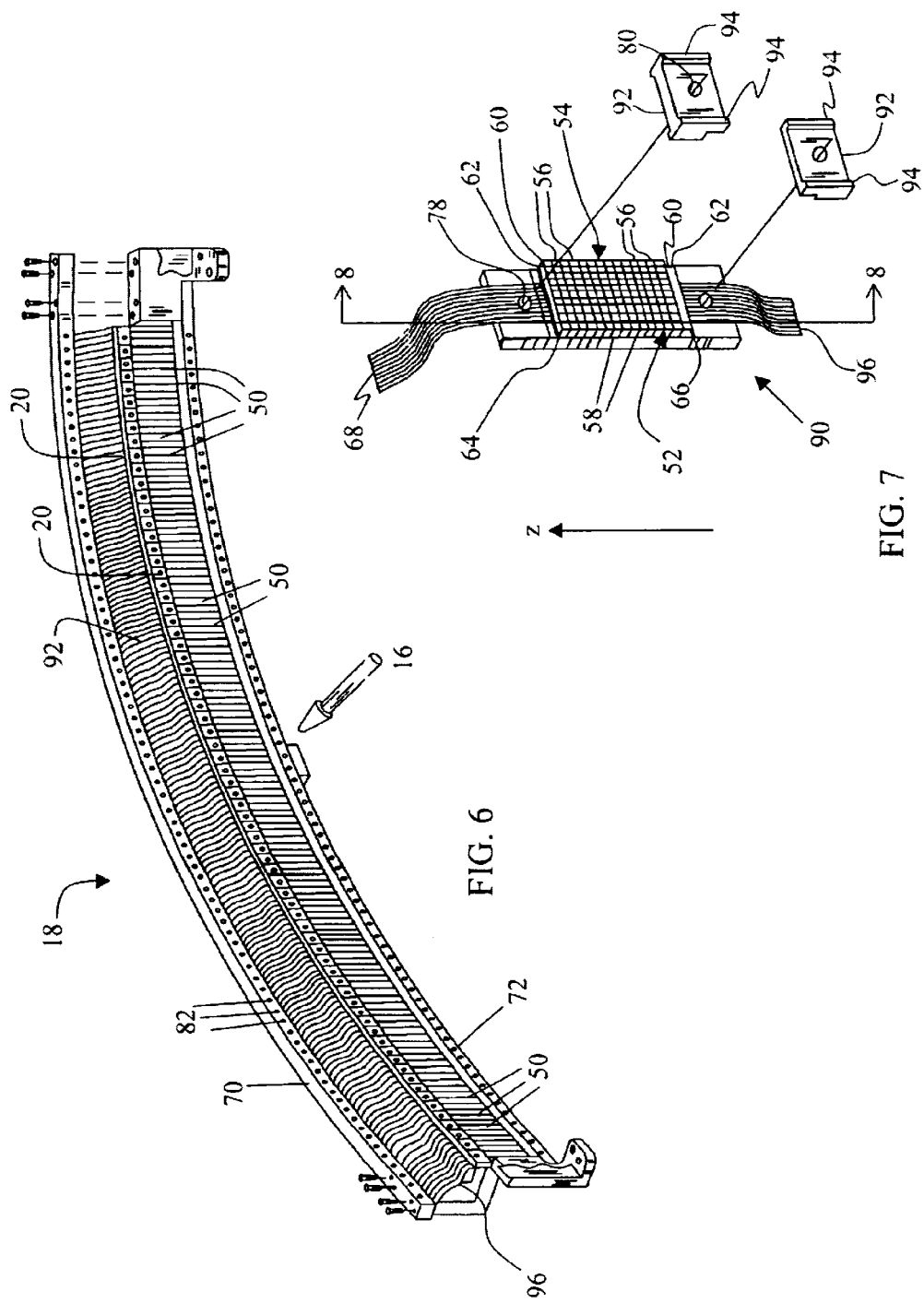
FIG. 6 is a perspective view of another embodiment of a CT system detector array of the present invention.
FIG. 7 is a perspective view of one of the detector module assemblies of the detector array shown in FIG. 6.
Figure 8:
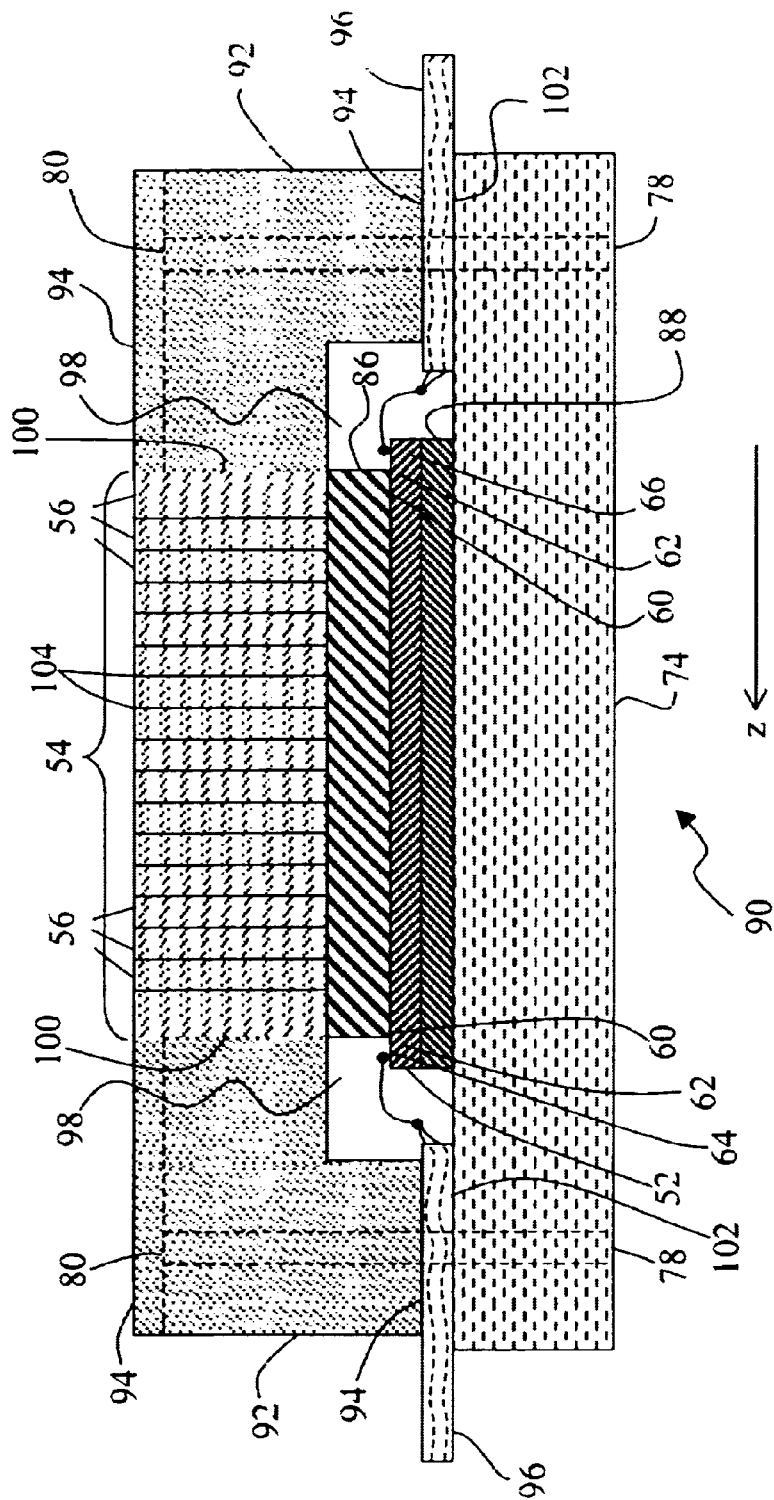
FIG. 8 is a schematic cut-away view of the detector module assembly embodiment of FIG. 7 along a section labeled 8—8.

In another embodiment, and referring to FIGS. 6, 7, and 8, a detector module 90 is otherwise similar to detector module 50 of FIGS. 3, 4 and 5, uses brackets 92 as a clamping mechanism to clamp scintillator array 54 in place above photosensor array 54. Compliant clear film 86 is thus compressed in place between scintillator array 54 and photosensor array 52. In this embodiment, compliant clear film 86 may, but need not, have adhesive properties. Brackets 92, which replace brackets 76 of detector module 50, also have flanges 94 that support rail 70 (or 72), but also extend to an opposite side of bracket 92 to provide a bridge through which flexible cable 96 extends. (Flexible cable 96 is similar to flexible cable 68, except that it is narrower so that it is held in place between flanges 94.) Thus, bracket 92 also clamps flexible cable 96 to substrate 74 (or, in one embodiment, flexible cable 96 is adhesively bonded to substrate 74). A region 98 is provided on each side of photosensor array 52 to provide room to wire bond cable 96. In one embodiment, conductors of flex cable 96 are directly wire bonded to circuits on photosensor array 52, including switch apparatus 60 and decoder 62. Brackets 92 are adhesively affixed to scintillator array 54 at interface 100 and to substrate 74 at interface 102. Screws (not shown) are fitted into holes 78 and 80, but are not relied upon to clamp scintillator array 54 in place.

The clamping mechanism provided by brackets 92 holds scintillator array 54 in place and separates scintillator array 54 from photosensor array 52, without necessarily relying upon the elastic force of elastomeric film 86 to hold them apart. Thus, a gap filled by elastomeric film 86 does not drift during manufacture or over the lifetime of detector array 18, and neither photosensor array 52 nor scintillator array 54 shift in position over the lifetime of the product. Air gaps between elastomeric film 86 and either scintillator array 54 or photosensor array 52 should be kept to less than ½ of the wavelength of light emitted by scintillator array 54 for efficient optical transfer. In one embodiment, elastomeric film 86 is a clear film that flows into micro voids on surfaces of scintillator array 54 and photosensor array 52.

In one embodiment, brackets 92 are made of a material selected to reduce thermal stress of the assembly. In particular, brackets 92 compensate for thermal mismatch between scintillator array 54 and the photosensor array 52/substrate 74 assembly. Scintillator array 54 has a specific composite thermal coefficient of expansion in a z-direction that is a function of both the scintillator material and a reflector material that fills gaps 104 between scintillator elements 56. Photosensor array 52/ceramic substrate 74 assembly also has a thermal coefficient of expansion in the z-direction. In general, the coefficients of expansion are different. Brackets 92 hold scintillator array 54 in close alignment with photosensor array 52/ceramic substrate 74, both initially upon assembly and over time, while compensating for thermal coefficient mismatch between them. In one embodiment, alignment is achieved by gluing brackets 92 in place at joints 100 and 102. Thermal coefficient matching is achieved by selection of bracket 92 material. In one embodiment, the summed coefficient of expansion of scintillator array 54 and bracket 92 in the z-direction is equal to that of the photosensor array 52/ceramic substrate 74 assembly at joint 102.

For example, in one embodiment, photosensor array 52 is silicon having a thermal coefficient of expansion of $3 \times 10^{-6}/°$ C. Scintillator array 54 is a combination of yttrium gadolinium oxide and an epoxy reflector material having a thermal coefficient of expansion of $21 \times 10^{-6}/°$ C. Optical coupling epoxy, which can be used as clear, compliant film 86, has a thermal coefficient of expansion of $50 \times 10^{-6}/°$ C. Ceramic substrate 74, which is a high-density aluminum oxide, has a thermal coefficient of expansion of $8 \times 10^{-6}/°$ C. In this case, brackets 92 are made of a silica glass containing 7.5 percent titanium oxide. This bracket 92 composition has a near-zero thermal coefficient expansion and provides satisfactory service in this application. Other bracket 92 compositions are used in other embodiments. However, in each case, the thermal coefficient of expansion of bracket 92 is less than that of ceramic substrate 74, and when combined with scintillator array 54, effectively matches the coefficient of expansion of ceramic 74 to provide little or no stress at joint 102.

This embodiment of detector module 90 can be made by adhesively bonding photosensor array 52 to substrate 74. Flexible cable 96 is also electrically (and, in one embodiment, mechanically bonded) to photosensor array 52, for example, by wire bonding. Rectangles of film 86 are preformed by a stamping operation, the rectangles having a size configured for placement between photosensor array 52 and scintillator array 54. Preformed film rectangle 86 is placed on top of photosensor array 52. Scintillator array 52 is adhesively bonded to brackets 92 to form a scintillator/clamping mechanism assembly, the clamping assembly comprising brackets 92. The scintillator array 52/bracket 92 assembly is then adhesively bonded to substrate 74 at joints 102. The bonds at joints 102 also serve in one embodiment to clamp flexible cable (or cables) 96 to substrate 74 and causes photosensor array 52 to compresses film rectangle 86.

In another embodiment, the detector modules do not include an elastomeric or other compliant, clear film 86 between photosensor array 52 and scintillator array 54. Instead, the clamping mechanism of brackets 92 holds scintillator array 54 above photosensor array 52 so that opposing faces of scintillator array 54 and photosensor array 52 face one another across an air gap. Detector modules can be made in this way by omitting the stamping of preformed rectangles of film 86 and placing preformed film 86 on top of photosensor array 52. In this configuration, some of the light output from scintillator array 54 is lost. However, the amount of light lost is tolerable in most applications. Also, photosensor array 52 and scintillator array 54 can advantageously be separated, allowing recovery of parts in scrap assemblies.

Figure 9:
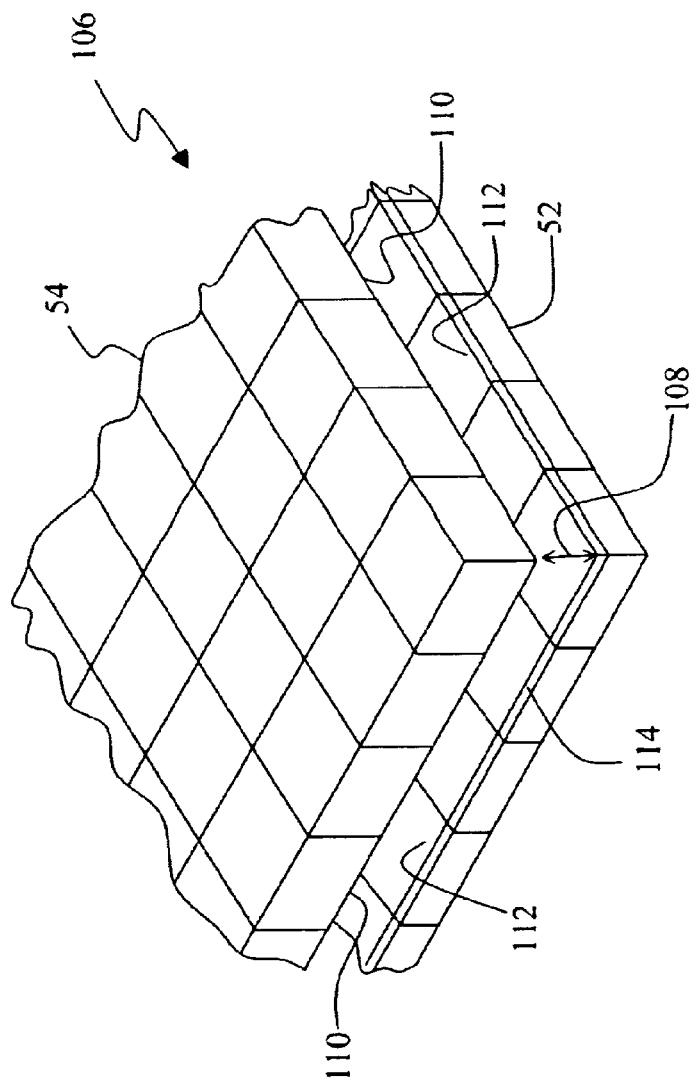
FIG. 9 is a perspective view of a portion of a detector module assembly similar to the embodiment of FIG. 7, but with an air gap between a scintillator array and the photosensor array.

For example, and referring to FIG. 9, detector modules 106 include an air gap 108 between photosensor array 52 and scintillator array 54. Either none, one or both of facing surfaces 110 and 112 of scintillator array 54 and photosensor array 52, respectively, have an anti-reflection coating 114 applied. Coating 114 is applied, for example, by sputtering or vapor deposition of thin, clear dielectric layers. In one embodiment, the coated surface or surfaces 110 and/or 112 are polished. The use of an anti-reflection filter increases gain and gain uniformity, and reduces cross-talk as compared to embodiments having an air gap without an antireflection filter. In addition, this embodiment retains the advantage of having separable and recoverable photosensor arrays 52 and scintillator arrays 54.

(In FIG. 9, only the scintillator array, the photosensor array, and a dielectric coating are shown. FETs, switching elements, decoders, and other portions of detector module 106 are not shown in FIG. 9. The depiction of grids in FIG. 9 is intended only to suggest one possible operational division of the photosensor arrays and scintillator arrays into individual detector cells.)

It will thus be seen that embodiments of the present invention provide improved coupling between scintillator arrays and semiconductor arrays in a finished detector module. In addition, decoupling caused by internal cracks and structural failure is reduced. Embodiments of the present invention can be produced at lower cost than known techniques, and yet produce higher light output and higher gain uniformity than known detector arrays, particularly in embodiments having anti-reflective coatings and/or elastomeric films or gels. In addition, detector reliability and life is improved because of the reduced stress and breakage, and the major components of the array can be separated and recovered. Thus, recovery of parts in scrap assemblies is made possible, and the cost of assembly field rework is reduced.

While the invention has been described in terms of various specific embodiments, those skilled in the art will recognize that the invention can be practiced with modification within the spirit and scope of the claims.

What is claimed is:

1. A finished detector module assembly suitable for use in a computed tomography (CT) imaging system, said detector module comprising:
    a substrate;
    a photosensor array mounted on the substrate;
    an array of scintillators optically coupled to said photosensor array and separated therefrom by a gap, said gap filled with a compliant clear film positioned distanced from at least one of said array of scintillators and said photosensor array less than one-half of a wavelength of light emitted by said scintillators;
    a clamping mechanism clamping said array of scintillators in place above and aligned with said photosensor array, wherein said clamping mechanism has a thermal coefficient of expansion less than that of said substrate; and
    a flexible electrical cable electrically coupled to the photosensor array.

2. A finished detector module in accordance with claim 1 wherein said compliant, clear film is an adhesive film.

3. A finished detector module in accordance with claim 1 wherein said compliant, clear film is a material selected from the group consisting of silicone, polyester, and acrylic materials.

4. A finished detector module in accordance with claim 1 wherein said compliant, clear film is selected from the group consisting of silicate and organic gels.

5. A finished detector module assembly suitable for use in a computed tomography (CT) imaging system, said detector module comprising:
    a substrate;
    a photosensor array mounted on the substrate;
    an array of scintillators optically coupled to said photosensor array and separated therefrom by a gap, said gap filled with a compliant clear film positioned distanced from at least one of said array of scintillators and said photosensor array less than one-half of a wavelength of light emitted by said scintillators;
    a clamping mechanism clamping said array of scintillators in place above and aligned with said photosensor array, wherein said clamping mechanism comprises a silica glass containing titanium oxide, said array of scintillators comprises yttrium gadolinium oxide and an epoxy reflector material, and said substrate comprises a ceramic; and
    a flexible electrical cable electrically coupled to the photosensor array.

6. A finished detector module assembly suitable for use in a computed tomography (CT) imaging system, said detector module comprising:
    a substrate;
    a photosensor array mounted on the substrate;
    an array of scintillators optically coupled to said photosensor array and separated therefrom by a gap, said gap filled with a compliant clear film positioned distanced from at least one of said array of scintillators and said photosensor array less than one-half of a wavelength of light emitted by said scintillators;
    a clamping mechanism clamping said array of scintillators in place above and aligned with said photosensor array, wherein said photosensor array and said array of scintillators have facing surfaces, and wherein at least one of said facing surfaces is coated with an antireflection film, wherein said surface of said array of scintillators is coated with said antireflection film; and
    a flexible electrical cable electrically coupled to the photosensor array.

7. A finished detector module in accordance with claim 6 wherein said surface of said photosensor array is coated with said antireflection film.

8. A finished detector module in accordance with claim 6 wherein at least one of said surfaces is polished.

9. A finished detector module in accordance with claim 6 wherein said surface of said photosensor array is polished.

10. A finished detector module in accordance with claim 6 wherein said surface of said array of scintillators is polished.

11. A finished detector module in accordance with claim 6 wherein both said facing surfaces are polished.

12. A method for making a finished detector module suitable for use in computed tomography (CT) imaging systems, the finished detector module including a photosensor array optically coupled to an array of scintillators, said method comprising the steps of:

adhesively bonding a photosensor array to a substrate;

electrically bonding a flexible cable to the photosensor array;

preforming a compliant, clear film into a size and shape configured for placement between and optical coupling of the photosensor array to an array of scintillators;

placing the preformed film on top of the photosensor array;

placing a scintillator array on top of the preformed film, the scintillator and the preformed film separated by a gap less than one-half of a wavelength of light emitted by the scintillators;

adhesively bonding a clamping mechanism to the scintillator array to form a scintillator/clamping mechanism assembly, wherein said step of placing the scintillator array on top of the preformed film comprises the step of adhesively bonding the clamping mechanism of the scintillator/clamping mechanism assembly to the substrate, wherein the clamping mechanism has a thermal coefficient of expansion less than the substrate.

13. A method in accordance with claim 12 wherein the preformed, compliant, clear film is an epoxy-based adhesive film.

14. A method in accordance with claim 12 wherein the clamping mechanism comprises a silica glass containing titanium oxide, the array of scintillators comprises yttrium gadolinium oxide and an epoxy reflector material, and the substrate comprises a ceramic.

* * * * *